United States Patent

Kubiak et al.

[11] Patent Number: 5,346,515
[45] Date of Patent: * Sep. 13, 1994

[54] FLUIDIZED BED GAS GENERATOR FOR ALLOTHERMIC GASIFICATION OF COAL

[75] Inventors: Helmut Kubiak, Herne; Hans J. Schröter, Mühlheim; Günther Gappa, Gelsenkirchen; Heinrich Kalwitzki, Essen; Klaus Knop, Geldern, all of Fed. Rep. of Germany

[73] Assignee: Bergwerksverband GmbH, Essen, Fed. Rep. of Germany

[ * ] Notice: The portion of the term of this patent subsequent to Nov. 12, 2008 has been disclaimed.

[21] Appl. No.: 963,284

[22] Filed: Oct. 19, 1992

Related U.S. Application Data

[60] Continuation of Ser. No. 727,646, Jul. 9, 1991, abandoned, which is a division of Ser. No. 348,574, May 19, 1989, Pat. No. 5,064,444.

Foreign Application Priority Data

Oct. 16, 1986 [DE] Fed. Rep. of Germany ....... 3635215

[51] Int. Cl.$^5$ ................................ C10J 3/56
[52] U.S. Cl. ...................... 48/73; 422/192
[58] Field of Search ............... 48/73, 99, 202, 204, 48/203, 206, 210, 63, 64, 76, 77, 67, 62 R; 252/373; 165/104.16; 422/142

[56] References Cited

U.S. PATENT DOCUMENTS

| | | | |
|---|---|---|---|
| 2,577,632 | 12/1951 | Roetheli | 48/203 |
| 2,591,595 | 4/1952 | Ogorzaly | 48/206 |
| 2,619,415 | 11/1952 | Hemminger | 48/206 |
| 2,633,416 | 3/1953 | Gornowski et al. | 48/203 |
| 2,634,198 | 4/1953 | Kalbach | 48/202 |
| 2,657,124 | 10/1953 | Gaucher | 48/202 |
| 3,912,465 | 10/1975 | Kunii et al. | 48/202 |
| 3,927,996 | 12/1975 | Knudsen et al. | 48/202 |
| 3,932,196 | 1/1976 | Wilson et al. | 48/202 |
| 5,064,444 | 11/1991 | Kubiak et al. | 48/202 |

FOREIGN PATENT DOCUMENTS

| | | |
|---|---|---|
| 2423951C3 | 11/1975 | Fed. Rep. of Germany . |
| 2549784C2 | 5/1977 | Fed. Rep. of Germany . |
| 3042142C2 | 6/1982 | Fed. Rep. of Germany . |
| 3112708C2 | 10/1982 | Fed. Rep. of Germany . |
| 3136645A1 | 3/1983 | Fed. Rep. of Germany . |
| 3339061C2 | 5/1984 | Fed. Rep. of Germany . |
| 51-9762 | 3/1976 | Japan ............ 48/202 |
| 103136 | 8/1979 | Poland . |
| 99663 | 11/1980 | Poland . |

*Primary Examiner*—Peter Kratz
*Attorney, Agent, or Firm*—Herbert Dubno

[57] ABSTRACT

Apparatus is disclosed for the allothermic gasification of coal with steam. The gasifier is vertically arranged with heat exchange tubes in separate gasification and pyrolysis zones so that a heat exchange medium is used in both zones.

1 Claim, 2 Drawing Sheets

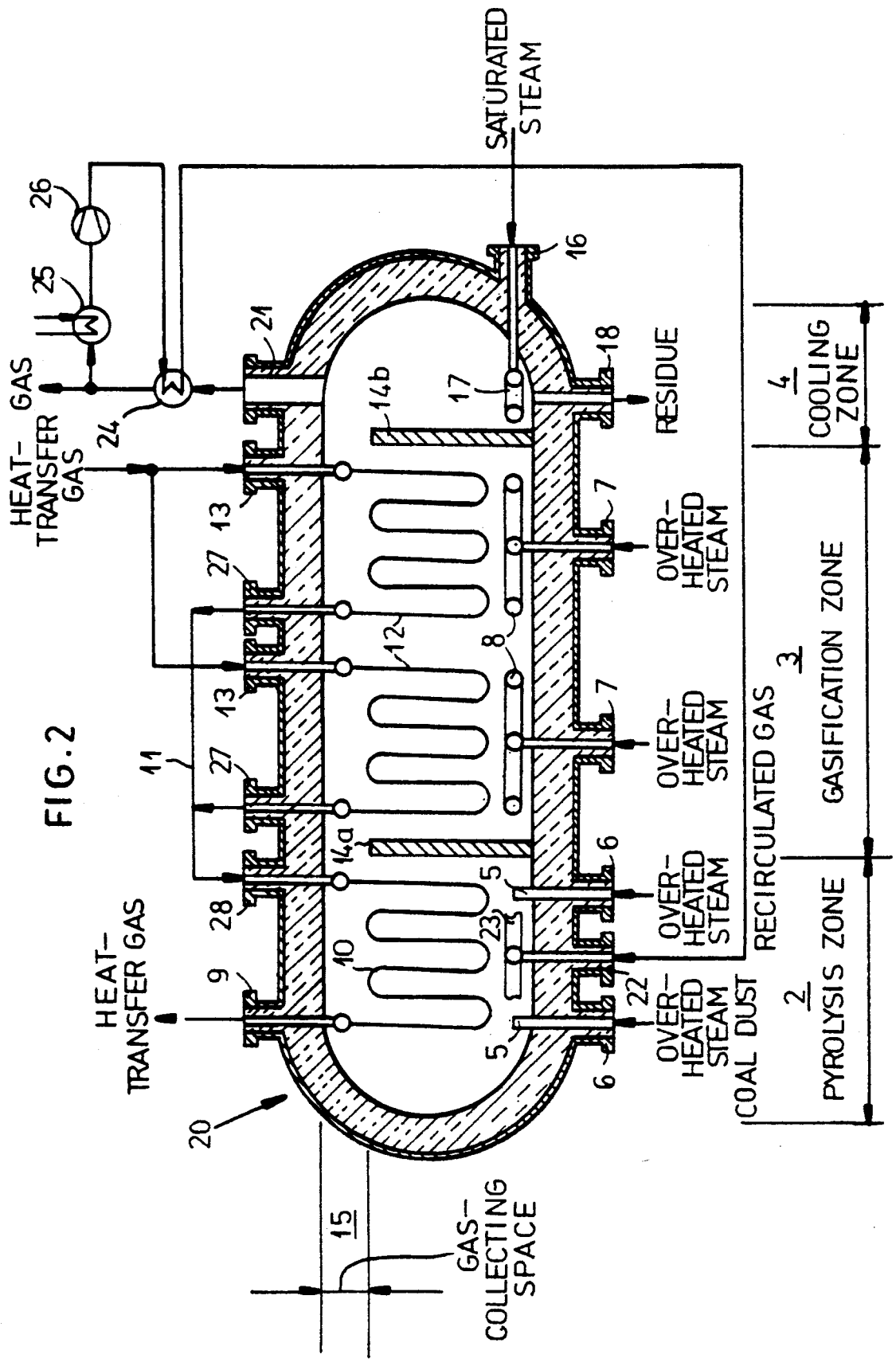

FLUIDIZED BED GAS GENERATOR FOR ALLOTHERMIC GASIFICATION OF COAL

CROSS-REFERENCE TO RELATED APPLICATIONS

This is a continuation of co-pending application Ser. No. 07/727,646 filed on Jul. 9, 1991, now abandoned, which is a div. of Ser. No. 07/348,574 filed May 19, 1989, now U.S. Pat. No. 5,064,444.

FIELD OF THE INVENTION

The invention relates to an apparatus for the allothermic gasification of coal under pressure with steam, in the for of a gas generator containing heat-exchange tubes for the heat transfer medium, and, more particularly, to a fluidized bed gas generator for carrying out the process.

THE RELATED ART

Basically, the gasification of solid fuels takes place at elevated temperatures. The heat required for the heating and conversion, is either provided through partial combustion (autothermic process) or through supply of external heat (allothermic process). Compared to the autothermic gasification, the allothermic gasification has the advantage that the fuel does not have to be partially burned in the gasification zone in order to provide the necessary heat. In the allothermic gasification, the heat can be provided from any external sources, such as, for instance, high-temperature core reactors, but also from combustion chambers, wherein a fraction of the gas product is burned. This advantage is afforded in the case of coal gasification up to high conversion degrees, as well as in the case of partial gasification, whereby next to a gas a fine coke is to be produced, e.g. for a process for the production of pig iron, with coupled gas production.

Allothermic fluidized bed gas generators of horizontal and vertical construction are known per se, for instance from German Patent Document 951, 24 23 German Patent 25 49 784, German Patent Document 31 12 708 and German Patent Document 30 42 142. In these inventions, a common departure point was that in all zones of the gas generator the heat carrier is supplied parallely with the high lead temperature, also for instance, in the coal dosage zone. In this zone, the heating of the coal takes place, whereby also the volatile components contained in the coal are eliminated. Thereby, the individual coal particles, in their structure and chemical composition, make the transition to the state of coke particles. While the eliminated volatile substances, particularly the resultant tars, are further converted in secondary reactions, the resultant coke starts to gasify. The process of release of the volatile substances and of coke formation, which precedes the actual gasification process, is called the pyrolysis zone.

OBJECT OF THE INVENTION

It is the object of the invention to develop the process of the aforementioned kind so that the supplied heat is optimally used, as well as to provide a suitable gas generator.

SUMMARY OF THE INVENTION

This object is attained in a process for allothermic gasification of coal under pressure of steam in a gas generator containing heat-exchange tubes for a heat-transfer medium wherein the hot heat-transfer medium coming through the heat-exchange tubes in the gas generator is first introduced into a gasification zone and subsequently into a pyrolysis zone, while the coal to be gasified is passed in counterflow through the gas generator, so that for coal heating and pyrolysis the already cooled down heat-transfer medium is used, while heat required for gasification is extracted from a still hot stream of heat-transfer medium.

Due to the successive arrangement of gasification and pyrolysis zones, considered from the heat-transfer side, the entire energy at high temperature is made available to the gasification zone, a fact which is very favorable to the kinetics, i.e. the speed of the gasification process. Subsequently, the entire heat-transfer medium reaches the pyrolysis zone with a lower entering temperature, and remains there to cover the heat needs for the heating and the pyrolysis process. Since the heat carrier and gasification medium are traveling in counterflow, there results a clearly improved heat utilization of the heat-transfer medium. From the point of view of kinetics, the lowered temperature has no negative effect on the pyrolysis reaction, because there, it is less a matter of high temperatures, than of sufficiently large amounts of available heat. This is insured by the large mass of the flow of the heat-transfer medium and by a suitable dimensioning of the heat exchangers.

Besides serving as a gasification medium and a fluidizing medium, the steam can also serve as a further heat-carrier supplier for the coal gasification, in order to increase the gasification efficiency through the temperature boost.

The coal supply takes place suitably by means of recirculated raw gas or overheated steam, preferably at approximately 700° to 800° C. In order to crack the tars formed during pyrolysis into gaseous hydrocarbons, so that tar condensation in subsequent apparatus is avoided.

It is advisable that the fluidizing of the coal particles be carried out by means of overheated steam, which is preferably introduced in the gasification zone at 700° to 800° C., so that the heat amount from the heat-transfer medium is exclusively used for the benefit of the gasification.

A fluidization and cooling of the ash particles can take place in a separate cooling zone by means of steam, whose temperature lies preferably 20° to 100° C. above the pressure-dependent dew point, in order to use the heat of the ash particles at a high temperature level.

The cooling of the ash particles with steam takes in vertically arranged apparatus, preferably in a traveling layer, in order to minimize the steam requirements.

The supply of the coal takes place preferably in the pyrolysis zone, and is performed via several jet delivery or supply lances in order to prevent the agglomeration of the coal particles. Such jet delivery lances are known from the German Open Application 31 36 645, for instance.

The dosed elimination of the cooled ash from the cooling zone is suitably done via a discharge sluice. Such a discharge sluice for heat materials is known, for instance, from the German Patent 33 39 061.

It is advisable to use flue gas as the heat-transfer gas, preferably with a temperature of 950° C., since it carries large heat amounts through its high density and can be produced from the products of this process in secondary processes.

Helium can be used as a heat-carrying gas, which can be extracted from a secondary cycle of a high temperature reactor at approximately 900° C., or from its primary cycle at up to approximately 950° C. and which has very good heat-transfer properties.

The following fluidized bed gas generators are suitable for the implementation of the process.

A first embodiment of a fluidized bed gas generator for the implementation of the process is characterized in that a cylindrical pressure tank of a horizontally arranged gas generator is subdivided into a heating- and pyrolysis zone, a separate gasification zone, as well as a separate cooling zone. The heating- and pyrolysis zone is provided with jet-type coal supply openings with a raw-gas regenerative circuit supply line, or with a steam supply line. The gasification zone has steam supply lines connected with inflow bottoms. A steam supply line with inflow bottoms and a discharge sluice are assigned to the cooling zone. The heating- and pyrolysis zone has a heat-transfer gas supplier and heat-exchange tubes, as well as an internally and externally running connection pipe. Connected with a heat-exchange tube and a heat transfer gas discharge in the gasification zone. Between the gasification zone and the heating and pyrolysis zone is provided a dam impermeable to gas and solid substances. Above the zones there is a gas collection space with gas evacuation.

In the horizontal embodiment of the gas generator, a considerable saving of steam is achieved due to the fact that the steam supplied to the gasification zone, after its partial conversion in this zone, is joined with the raw gas from the heating- and pyrolysis zone. There after a recuperative heat exchange, partially flows into the pyrolysis area, so that in this gas generator, there is no further need for steam in the pyrolysis zone. Similar to a further-described vertical embodiment of the gas generator, in the gasification zone the steam content can be kept at a very high level, which again has a favorable effect on the kinetics. The non-converted steam is absolutely sufficient to satisfy the requirements for the secondary pyrolysis reaction in the heating- and pyrolysis zone, after partial reverse travel as humid raw gas.

The horizontal arrangement of the gas generator with a dam impermeable to solid substances has an additional advantage over the further-described vertical embodiment. Here it is not only possible to subdivide into two stages the gasification zone, but even to have an additional cascading. The so-called backmixing is thereby even strongly repressed.

In the case of the horizontally arranged fluidized bed gas generator, it could be advisable to provide an additional raw-gas regenerative circuit feeding line and an inflow bottom and to involve gas-recycling heat exchanger and a gas pump.

A second embodiment of the fluidized bed gas generator for the implementation of the process is characterized in that a cylindrical pressure tank of a vertically arranged gas generator is subdivided into a heating- and pyrolysis zone located in its upper area, a separate gasification zone arranged thereunder, as well as a separate cooling zone arranged underneath it. The heating- and pyrolysis zone is provided with jet-type coal-supply openings with a raw-gas regenerative circuit supply line, resp. with a steam supply line. The gasification zone has a steam supply line which is connected to an inflow bottom, and assigned to the cooling zone is a steam supply line with inflow bottoms and a discharge sluice. In that heating- and pyrolysis zone are provided a heat-transfer gas supply line, heat-exchange tube and a heat-transfer gas discharge in the gasification zone. Between the gasification zone and the heating- and pyrolysis zone is a dam permeable to gas and solid substances. Above the heating- and pyrolysis zone, a gas collection space with a gas discharge.

In the vertical embodiment of the gas generator, it is advantageous that considerable amounts of steam be saved. Steam supplied to the gasification zone, after its partial conversion in this zone, flows directly with the produced gas into the pyrolysis area, so that practically no additional need for steam exists in this area.

At the same time, an additional advantage results, namely that the steam content can be kept at a high level in the gasification zone, which again benefits the kinetics of the process. The steam which was not converted in the gasification area is absolutely sufficient to cover the needs in connection with the tar conversion in the pyrolysis zone.

A further advantage of the vertically arranged gas generator embodiment is that the superimposed arrangement of pyrolysis- and gasification zones makes possible a separation of the two zones by a dam permeable to gas and solid substances. The thereby obtained subdivision into two stages (cascading) clearly diminishes the undesired mixing of the freshly supplied fuel with the fuel coming from the gasification zone (so-called backmixing), so that a gasification with a high-conversion degree is possible.

Further advantages in comparison to other processes result also for the horizontal, as well as the vertical gas-generator embodiment, due to the cooling of the residual coke in the cooling zone.

In the horizontal embodiment, the residual coke, after its transfer from the gasification- into the cooling zone, is cooled by produced gas or steam at lower temperatures. In the vertical construction, however, this cooling takes place preferably through steam, at a temperature of 20°-100° C. above the dew point, in order to avoid an inhibition of the reaction in the gasification zone located thereabove, due to product gas. On the one hand, the residual coke is cooled down to a temperature which allows a technologically simpler dosed discharge. On the other hand, an even greater advantage results from the fact that—particularly in the case of partial gasification—an effective utilization is made possible of the sensible heat of the produced fine coke.

BRIEF DESCRIPTION OF THE DRAWING

Further, the invention is more specifically explained with the aid of the drawing which shows:

FIG. 2 the principle of the invention, represented in a horizontally arranged gas generator.

DETAILED DESCRIPTION

Figure 1:
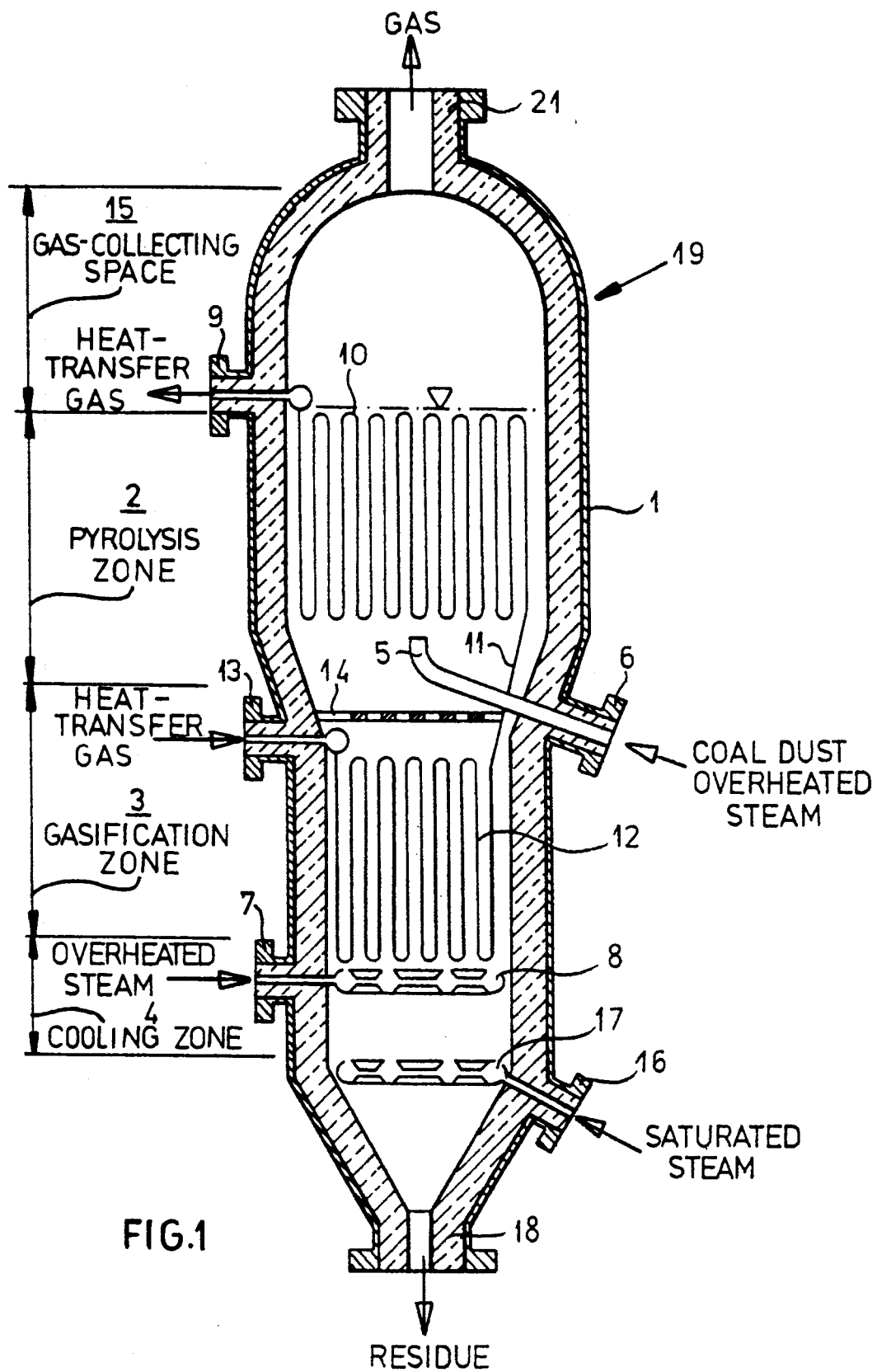
FIG. 1 the principle of the invention, represented in a vertically arranged gas generator.

FIG. 1 shows a pressure tank 1, which is divided into four zones, which in a vertically designed gas generator 19 are arranged one on top of the other. The uppermost zone is a gas collecting space 15, wherefrom the gas can be evacuated through a pipe connection 21. Into the next zone, heating-and pyrolysis zone 2, fine coal dust as gasification material and steam as a gasification medium at a temperature of approx. 700° to 800° C. are pneumatically supplied in doses through a jet-type supply device or lance 5. Details of this supply device are described in German open application 31 36 645 (U.S. Pat. No.

4,419,487). In the cylindrical portion of the zone 2, there is a pipe connection 9 for the evacuation of the heat-transfer gas, which is connected with heat exchange tubes 10. The diameter of the pyrolysis zone is adjusted to the gas velocity, which is measured in accordance with the gas amounts exiting from the underlying gasification zone and the gas amounts supplied by the jet-type supply device. The heat-transfer medium is directed in counterflow with respect to the gasification fuel, from a gasification zone 3 to a lower temperature level in the pyrolysis zone 2.

The gasification zone 3 is located in the median portion of the pressure tank. It is provided at the bottom with a pipe connection 13 for the supply of the hot heat-transfer medium. This reaches the heat-exchange tubes 12 with a high temperature (approximately 900° C. to 950° C.) and transfers its sensible heat to the gasification fuel for the transformation into gas. Via a pipe 11, the cooled heat-transfer gas enters the heat-exchange tubes 10 in the heating- and pyrolysis zone 2, and then through the pipe connection 9, it exits the pressure tank 1 at approximately 750° C. to 800° C. The overheated steam at approximately 700° C. to 800° C. is directed towards the fluidized bed in zone 3 over an inflow bottom 8. According to a construction variant which is not shown in the drawing, the pipe connections 9 and 13 for the outlet, respectively, the inlet of the heat transfer gases, can also be arranged next to each other in the area of the general exit pipe connection.

In order to improve the dwelling time of the gasification medium (lowering of backmixing), the gasification- and pyrolysis zones 3, or 2, are separated from each other by a dam 14 permeable to gas and solid substances. The dam 14 is conceived in such a way that in its outer area which is close to the wall, preferably the coal dust from the pyrolysis zone 2 flows into the gasification zone 3, meeting the motion of the solid substance, which forms a fluidized bed.

Underneath the gasification zone 3, still in the cylindrical part of the pressure container 1, follows a cooling zone 4 for the fuel residue. The cooling zone 4 is subjected to steam via a pipe connection 16 and inflow bottom 17, the temperature of the steam lying 20° to 100° C. below the dew point. The cooling zone 4 is preferably operated as a travelling layer. However, the residue can also be fluidized through an increase in the amount of steam inflow. Underneath the inflow bottom 17, the pressure tank tapers off conically, towards the pipe connection 18 for the discharge of the cooled residue, which takes place through a sluice which is not shown in the drawing, such as in German Patent 33 39 061.

In FIG. 2 is represented a horizontally arranged gas generator. The pressure tank is here also divided into four zones, three of them being arranged in succession. In the foremost zone, the heating- and pyrolysis zone 2, the fine coal dust is fed by jet-type supply devices 5 through the pipe connection 6, in a dosed manner. Further, through the pipe connection 6, recycled humid raw gas or overheated steam are supplied, which have been brought to a high temperature recuperatively or in a here not shown combustion chamber. This gas serves for the fluidization and conversion of the primarily formed products of coal pyrolysis. In the upper area of the pressure tank 1, the pipe connection 9 is located, for the evacuation of the heat-transfer medium, which is connected with the heat-exchange tubes 10.

In a middle portion of the pressure tank 1 is arranged the gasification zone 3. This zone comprises at the bottom 8 the pipe connection 7 for the supply of the overheated steam. The overheated steam is directed to the fluidized bed in the gasification zone 3, via inflow bottoms 8. In the example, the heat-exchange tubes 12 in the gasification zone are arranged parallely on the heat-carrier side, so that heat-transfer medium at a high temperature is available over the entire zone.

The heat transfer medium at high temperatures reaches the gasification zone 3 over the pipe connection 13, passes there through the pipe connection 27 and through the connection pipe 11, which in this example, runs outside the pressure tank 1, from the gasification zone 3 via pipe connection 28 at a lower temperature level into the pyrolysis zone.

The gasification- and pyrolysis zones 3, or 2, are separated by a dam 14a impermeable to gas and solids, which in this case is located in the area of zones 2 and 3, in order to improve the dwelling time (lowering and backmixing).

The gasification zone 3 is also separated from a subsequent cooling zone 3 by a dam 14b impermeable to gas and solid substances. For the cooling of the residual ash, and optionally for fluidization, the cooling zone 4 is subjected to steam close to the saturated-steam temperature or preferably with dry product gas, through the pipe connection 16 and the inflow bottom 17. Above the cooling zone 4 is provided a pipe connection 21 for the gas discharge. This is connected to the gas-collecting space 15, which extends in the longitudinal direction, on top of the successively arranged zones 2, 3, and 4.

Via a pipe connection 22, a humid raw gas can be fed into the heating- and pyrolysis zone 2, over the inflow bottom 23. In the example, this recirculated gas is preheated via heat exchangers 24, 25 and transported over a blower to the pipe connection 22.

The discharge of the residue from the cooling zone 4 takes place over the pipe connection 18, preferably over a sluice according to German Patent 33 39 061, here not shown in the drawing.

COMPARATIVE EXAMPLES

In the following, a comparison is provided of essential data of the new process with the allothermic coal gasification with the heretofore known coal gasification processes with steam (see for instance German Patent 24 23 951.8, German Patent 25 49 784.1, German Patent 31 12 708.8). For readier comparison there is established a thermal output of the heat source of 340 MW. For full gasification (Table 1), the process with a horizontally arranged gas generator of the state of the art is compared as opposed to the processes with horizontally or vertically arranged gas generators of the invention. For the partial gasification (Table 2), for which an upright gas generator is particularly suited, only a comparison is provided between the process of the state of the art and the new process with upright gas generators according to the invention.

TABLE 1

Comparison for full gasification 95% conversion

| | Process according to the invention | | Process according to the state of the art |
|---|---|---|---|
| | Horizontal Generator | Vertical Generator | |
| Thermal Output of the Heat Source (MW) | 4 × 85 = 340 | 2 × 170 = 340 | 1 × 340 |
| Number of Gas Generators | 4 | 2 | 1 |
| Dimensions of Gas Generators | | | |
| length/height (m) | 18 | 20 | 33 |
| diameter, outside (m) | 5.0 | 7.0 | 7.0 |
| Pressure (bar) | 21 | 21 | 44 |
| Coal Conversion Degree (%) | 95 | 95 | 95 |
| Coal Throughout (t/h) | 60 | 30.5 | 27.3 |
| Spec. Steam Input $\frac{t\,H_2O}{t_{coal,\,one}}$ | 2.67 | 2.53 | 6.95 |
| Steam Decomposition Degree (%) | 49 | 52 | 19 |
| High-Temperature Heat Utilization (%) | 21.6 | 10.0 | 9.4 |

TABLE 2

Comparison for Partial Gasification (50% Conversion)

| | Process according to the invention vertical gas | Process according to the state of the art horizontal gas generator |
|---|---|---|
| Thermal Output of the Energy Source (MW) | 2 × 170 = 340 | 1 × 340 |
| Number of Gas Generators | 2 | 1 |
| Dimensions of Gas Generator | | |
| length/height (m) | 20 | 33 |
| diameter, outer (m) | 7.0 | 7.0 |
| Pressure (bar) | 21 | 41 |
| Coal Conversion Degree (5) | 50 | 50 |
| Coal Throughput (t/h) | 112.0 | 84.6 |
| Spec. Steam Input $\frac{t\,H_2O}{t_{coal,\,one}}$ | 0.99 | 2.44 |
| Steam Decomposition Degree (%) | 52.0 | 21.1 |
| High-Temperature Heat Utilization* (%) | 19.6 | 13.7 |

*In the determination of the high-temperature utilization for the coal gasification the $\Delta\alpha$ of the heat-transfer medium at the gasification zone is consideration in relation to the total $\Delta\beta$ of the heat carrier. This way, for instance, the total $\Delta\alpha$ in the nuclear coal gasification is determined through the lead and return temperature of the secondary helium.

From Table 1, it can be seen that in the process according to the invention, with the same available thermal output of the heat source of 340 MW and with the same coal conversion degree of 95%, in the case of the vertical gas generator, at a slightly higher coal throughput, there is a clearly lower steam input than in the process according to today's state of the art. This results essentially from features of the invention and to the lowering of pressure. In the case of the horizontal gas generator, besides the same advantage in connection with the steam input, there are also the advantages of approximately double coal throughput and the clearly improved utilization of the high-temperature heat.

Similar advantages can be seen in the case of a partial gasification for the simultaneous production of fine coke table 2). As compared to the gasification with 95% conversion degree, for the vertical gas generator with a conversion degree of 50%, the additional advantage of a clearly higher coal throughput appears, when seen comparatively with the process according to today's state of the art.

We claim:

1. A fluidized bed gas generator comprising:
a cylindrical pressure tank having a vertical axis, said tank comprising:
a pyrolysis zone in an upper area of said tank provided with a set of heat exchange tubes;
a gasification zone located beneath said pyrolysis zone and provided with a set of heat exchange tubes;
a cooling zone located below said gasification zone, each of said zones lying one above another along said vertical axis;
a coal-supply device which is a supply lance leading into said pyrolysis zone and opening upwardly therein below said set of heat exchange tubes in said pyrolysis zone;
a means for supplying coal to said supply lance whereby said coal is transported with a gas;
a steam supply pipe connection leading into an inflow bottom of said gasification zone, said bottom being a hollow structure at least partially extending across said tank perpendicular to said vertical axis and having upwardly open outlets distributing steam from said supply pipe;
a further steam supply connection leading into a further inflow bottom of said cooling zone, said cooling zone being delineated between said inflow bottoms;
a downwardly tapering evacuation sluice leading from said cooling zone;
means for conducting a heat transfer gas supply into said pyrolysis and gasification zones and including a heat transfer gas supply connection leading through said gasification zone and communicating with said set of heat exchange tubes in said pyrolysis zone and with said set of heat exchange tubes in said gasification zone;

a dam permeable to gas and solids disposed between and separating said gasification and pyrolysis zones; and a gas collecting space above said pyrolysis zone and having a gas outlet.

* * * * *